(12) United States Patent
Crew

(10) Patent No.: US 7,154,475 B2
(45) Date of Patent: Dec. 26, 2006

(54) COMPUTER MOUSE WITH MAGNETIC ORIENTATION FEATURES

(75) Inventor: Laurence James Crew, Darlinghurst (AU)

(73) Assignee: Cylo Technology Pty Ltd, Eveleigh (AU)

( * ) Notice: Subject to any disclaimer, the term of this patent is extended or adjusted under 35 U.S.C. 154(b) by 463 days.

(21) Appl. No.: 10/718,595

(22) Filed: Nov. 24, 2003

(65) Prior Publication Data

US 2004/0104892 A1    Jun. 3, 2004

(51) Int. Cl.
  *G09G 5/00* (2006.01)
  *G09G 5/08* (2006.01)
(52) U.S. Cl. .................. 345/163; 345/156; 345/158
(58) Field of Classification Search ........ 345/156–169, 345/184; D14/114, 107
  See application file for complete search history.

(56) References Cited

U.S. PATENT DOCUMENTS

| 4,887,230 | A | | 12/1989 | Noguchi et al. |
| 5,162,781 | A | | 11/1992 | Cambridge |
| 5,703,623 | A | * | 12/1997 | Hall et al. ................... 345/158 |
| 5,831,553 | A | * | 11/1998 | Lenssen et al. ............... 341/20 |
| 5,912,660 | A | * | 6/1999 | Gouzman et al. ........... 345/163 |
| 5,936,612 | A | | 8/1999 | Wang |
| 6,040,539 | A | * | 3/2000 | Hiegel ..................... 200/302.1 |
| 6,130,664 | A | | 10/2000 | Suzuki |
| 6,323,843 | B1 | * | 11/2001 | Giles et al. ................. 345/163 |
| 6,342,878 | B1 | | 1/2002 | Chevassus et al. |
| 6,788,290 | B1 | * | 9/2004 | Huang ........................ 345/158 |
| 2001/0050673 | A1 | * | 12/2001 | Davenport .................. 345/163 |

* cited by examiner

*Primary Examiner*—Richard Hjerpe
*Assistant Examiner*—Duc Dinh
(74) *Attorney, Agent, or Firm*—Molins & Co.

(57) ABSTRACT

A computer mouse 10 has magnetic orientation features. It comprises a body 11 in which is located a mechanism 13 for sensing the x and y movement of the body and a compassing device 16 for determining the magnetic orientation of the body. The mouse has a processor 40 for receiving and processing x and y movement data and magnetic orientation data. The processor sends the processed data to a transmitter 15 located in the body. The transmitter is wireless and sends signals based on the x and y data and the magnetic orientation data in real time.

18 Claims, 3 Drawing Sheets

COMPUTER MOUSE WITH MAGNETIC ORIENTATION FEATURES

FIELD OF THE INVENTION

The invention pertains to a computer mouse and more particularly to a mouse which recognizes its own geomagnetic orientation and uses that orientation to transmit a related signal to a computer. In this way the mouse can obtain human inputs corresponding with three distinct degrees of freedom.

BACKGROUND OF THE INVENTION

A mouse for a computer is a form of interface in which the movement and position of the mouse, together with mouse button or switched inputs may be used as inputs to a computer. A conventional mouse may transmit signals to a computer in any of a number of ways. These signals may be interpreted by the computer's software drivers to accomplish a range of functions such as alter the position of a cursor, open menus, select objects or issue commands. In general, the position of the mouse on a physical desktop is translated into a position of a cursor on a screen. In the prior art, the computer mouse has been insensitive to geomagnetic orientation and has not used geomagnetic orientation for any purpose. However because software is becoming ever more sophisticated and greater means of interfacing with software are ever in demand, the need exists for additional forms of user interface and user input apart from those which are already in use. In the following disclosure the example of a wireless mouse is employed. It will be appreciated that both conventional or wireless data transmission from the mouse are useful, with wireless data transmission providing the more elegant and user friendly solution.

OBJECTS AND SUMMARY OF THE INVENTION

It is an object of the invention to provide a mouse which is adapted to recognize geomagnetic orientation and provide an output signal to a computer based on geomagnetic orientation.

It is also an object of the invention to provide a mouse which is insensitive to geomagnetic orientation when in pure translation.

It is another object of the invention to provide a wireless mouse which may be used in any rotational orientation.

Accordingly there is provided a mouse in which is located a geomagnetic sensor. The sensor produces a signal based on the rotation of the mouse, which signal which may be combined with signals produced by the mouse's optical sensor to create an output to a computer which is representative of three degrees of freedom. In preferred embodiments, signals related to the translation of the mouse are insensitive to the compass orientation of the mouse. In other embodiments, there is a threshold of rotational movement below which the device is insensitive. In preferred embodiments, the mouse is wireless.

BRIEF DESCRIPTION OF THE DRAWING FIGURES

BEST MODE AND OTHER EMBODIMENTS OF THE INVENTION

Provided is a computer mouse with three degrees of freedom. The mouse works in a similar manner to a normal computer mouse, with the additional feature of providing a third degree of freedom. The third degree of freedom is user generated by rotating the mouse on the desktop. This provides an input on the 'z' axis in addition to the normal 'x' and 'y' axes. The 'z' axis or component is input by rotation of the mouse but may be used to represent a number of graphic user interface features such as zoom through an axis, movement through layers of an on-screen graphic presentation, scrolling, rotation of 3-D graphic representations on screen, or panning.

Figure 1:
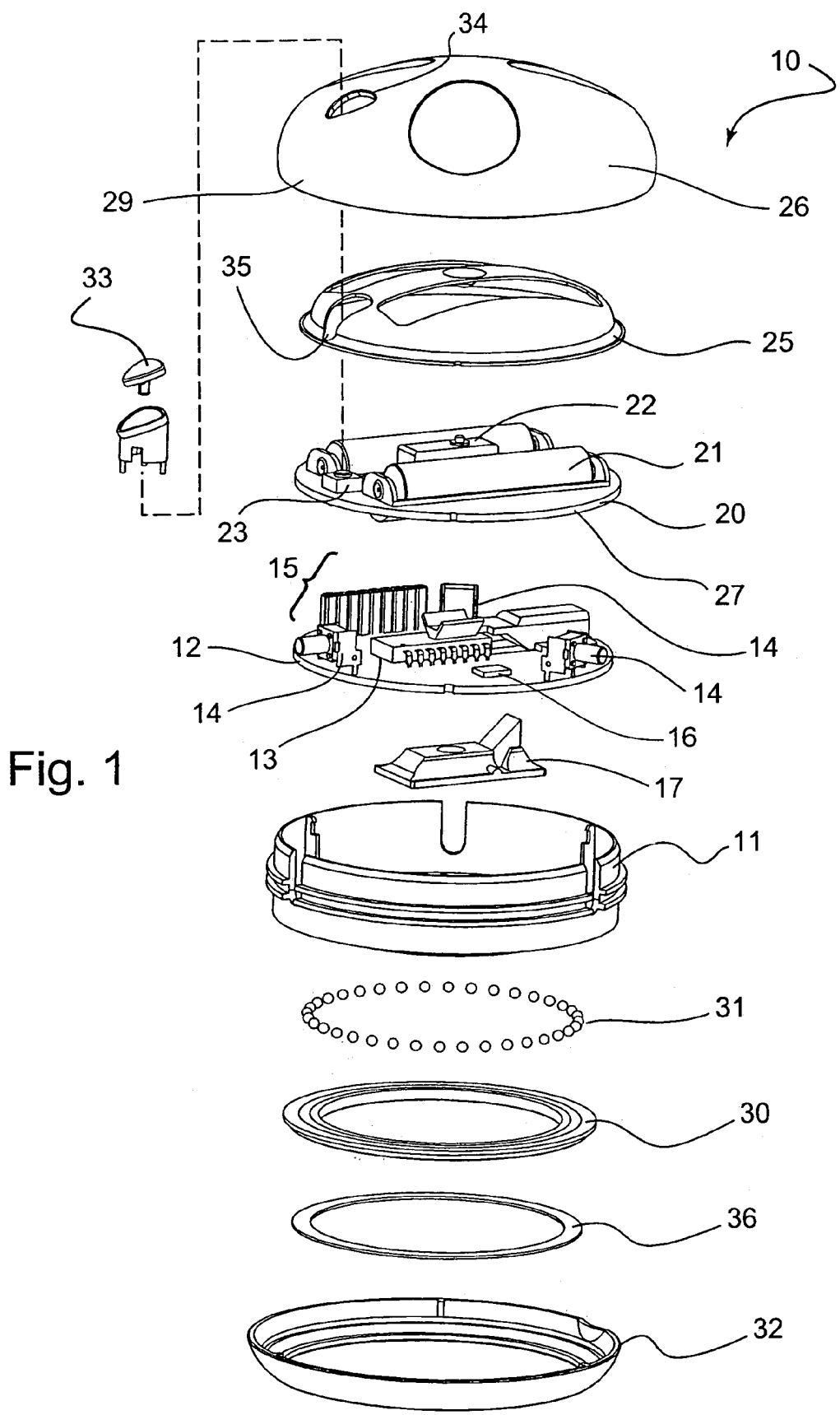
FIG. 1 is an exploded perspective of a mouse according to one embodiment of the present invention.

As shown in FIG. 1, the mouse 10 comprises a cylindrical chassis 11 to support within its inner periphery, a first circuit board 12 which carries a conventional optical sensor 13, one or more (preferably 3) primary switches 14 (for entering user commands) and the RF transmission chip set 15. The RF transmission chip set 15 sends signals based on the location, orientation or user command data that is transmitted to it. In addition, the circuit board 12 incorporates a solid state compassing device 16, consisting of two linear magnetic sensors (LMS) mounted at 90 degrees to each other, to determine the orientation of the mouse relative the Earth's magnetic field. Wireless transmission allows the mouse 10 to send movement data to a base station (RF receiver), then to the host computer. This allows the mouse to be rotated freely without the limitation of a wire tether. A lens assembly 17 is mounted below the circuit board 12. A second circuit board 20 is mounted above the first circuit board. The second circuit board holds the batteries 21 which power the device, a secondary switch 22 and an orientation switch 23.

A semi-rigid shell 25 is interposed between a flexible outer cover 26 and the second circuit board 20. The shell 25 transmits downward force from the cover to the secondary switch 22. The cover extends over the outer peripheries 27, 28 of the first and second circuit boards 12, 20. In this way a squeezing of the lower rim 29 of the cover 26 is transmitted to at least one of the primary switches 14 which are displaced from one another by, for example, by 90 or 120 degrees. The buttons forming the primary user input command switch may be wired in parallel with each other so that actuating any combination of the switches will result in the button press being registered as a user command input. In preferred forms, at least one of the primary switches 14 is assuredly activated by squeezing the lower rim 29 at diametrically opposite positions.

In some optional embodiments, a ball race 30 and ball bearings 31 are interposed between the chassis 11 and a retaining ring 32. This allows the base, being a low friction pad 36 to remain free from rotation while the components above the ball bearings 31 are free to rotate. This also allows the mouse to be rotated without 'wandering' in the 'x' or 'y' direction, by providing a lower friction coefficient in the rotational mode than in the linear mode.

The mechanism for sensing the 'x' and 'y' movement of the mouse is the conventional optical mouse sensor device 13, 17 etc. By combining the 'x' and 'y' movement from the optical sensor with the change in rotation angle (z) from the linear magnetic sensors 16, three degrees of freedom of control are able to be simultaneously achieved. These three movements are converted into RF data packets which are transmitted to the computer's optional RF receiver. In one embodiment the "z" information replaces the information normally attributed to the scroll wheel in a wireless or conventional scrolling mouse.

Since the angle of orientation of the mouse with respect to its environment is always known from the linear magnetic sensors 16, any movement in the 'x' and 'y' directions can be compensated so that the spatial mapping from the desktop to the computer screen is maintained regardless of the fact that the mouse is being rotated.

Since the angle of orientation of the desktop relative to the Earth's magnetic field is unknown, it is necessary to provide a means of setting the base orientation. This is achieved by providing an orientation switch 23. The orientation switch is accessed by the user by providing a mechanical button 33 which fits within an opening 34 in the cover 26, through an opening 35 in the shell and impinges on the orientation switch 23. At the time that the orientation switch is activated, the angle of rotation is stored in computer memory as the base orientation angle.

During operation, the offset angle is determined by the following formula:

offset angle=compass reading−base orientation angle

Figure 2:
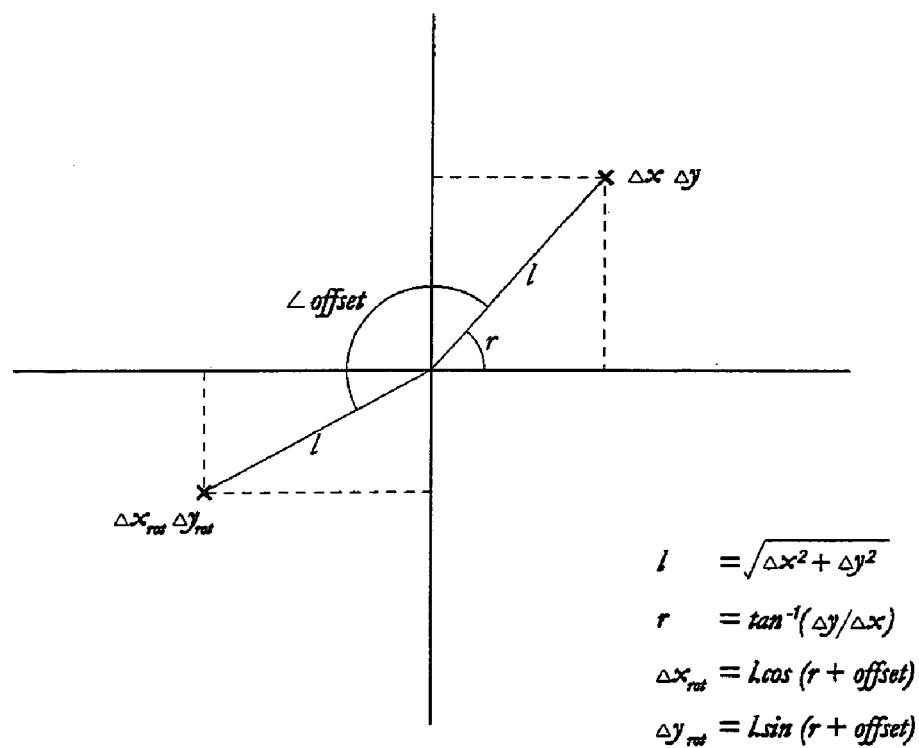
FIG. 2 is a schematic diagram explaining offset compensation according to one embodiment of the present invention.

As shown in FIG. 2, all movements of the mouse 10 are compensated based on the offset angle by converting from Cartesian to polar coordinates, then adding the offset angle, then converting back to Cartesian coordinates.

When the mouse is used for two dimensional operations with the 'z' axis used for window scrolling, it is necessary to suppress the scrolling function while the mouse is being moved in the 'x' or 'y' directions. Otherwise, inadvertent scrolling may occur as the mouse is rotated by small amounts during movement. If the mouse is being rotated without significant 'x' or 'y' movement, the scrolling function will be resumed. This may be done in software by incorporating a fixed or user set threshold for "z" axis movement. This may be done in hardware by providing a compass disabling switch on the mouse. This may also be accomplished by using software to detect a condition of an existing button, for example disabling the compass if the orientation switch is depressed for 5 seconds.

If the target application requires simultaneous input from all three degrees of freedom, it will inform the context sensitive driver. Under these conditions no suppression of the rotational (z) axis will occur.

Since the mouse needs to be operated at any angle of rotation, the operation of the user command buttons also need to be orientation free. The solution is to use, as previously mentioned, a central or secondary, 'push' button 22 activated from the center or top of the mouse, and one or more 'squeeze' or primary buttons 14 radially oriented on the outside perimeter of the mouse to provide for two-button operation. When the flexible, deformable exterior 26 is squeezed, at least one radial user command input button 14 is activated. Thus, the one or more primary buttons 14 act as a single switch that allows the exterior of the mouse to be essentially symmetrical and thus provide a user input, from any radial direction, for the user command which is associated with the primary button.

Figure 3:
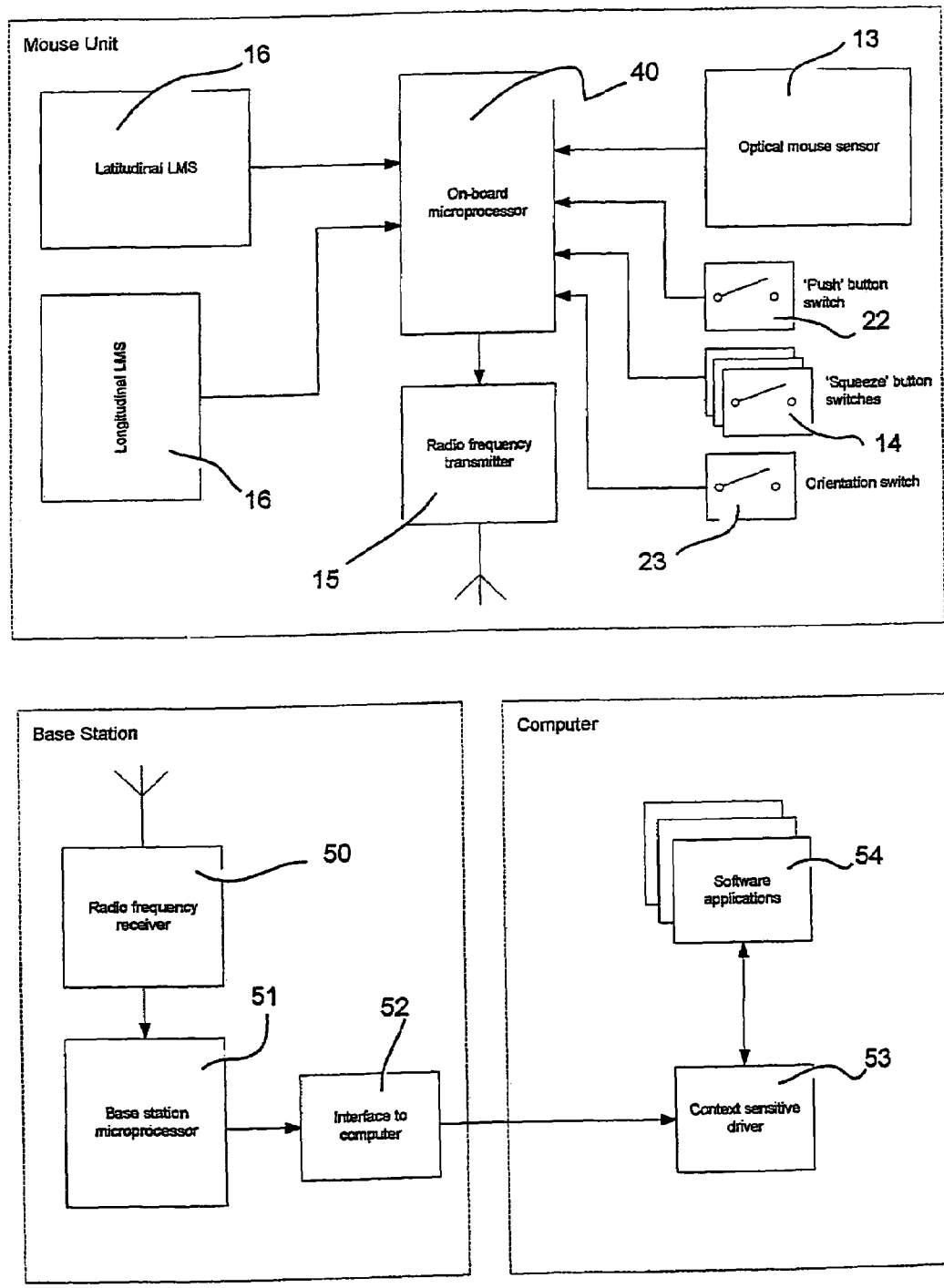
FIG. 3 is a schematic diagram of a computer circuitry according to one embodiment of the present invention.

As shown in FIG. 3, the mouse's on-board processor 40 receives inputs from the two LMS devices (in the form of magnetic orientation data), the optical sensor (being the x and y movement data), the radial or primary switch or switches 14 (being first command signals), the central or secondary switch (being second command signals) and the orientation switch 23 (being a base orientation command signal). It processes the totality of the incoming data in real time and provides processed and transmittable data to the mouse's on-board RF transmitter which then sends data packets containing the x, y, z and button or command data in real time. The computer's optional RF receiver 50 receives the transmission, decodes it with its microprocessor 51 and sends the decoded packet data, via an appropriate interface 52 to a context sensitive driver 53 which is associated with at least one software application 54.

Applications for the mouse include, but are not limited to: rotation of three dimensional objects on screen using the three degrees of freedom simultaneously; panning and zooming; operation of rotary interface controls; scrolling of window contents; and any other operation requiring up to three degrees of freedom of input control.

What is claimed is:

1. A computer mouse with magnetic orientation, comprising:
    a body in which is located a mechanism for sensing the x and y movement of the body and converting this movement to x and y body movement data;
    the body containing a compassing device for determining the magnetic orientation of the body and converting the magnetic orientation to magnetic orientation data;
    a processor for receiving and processing the x and y body movement data and the magnetic orientation data, the processing comprising the compensating, in real time, the x and y body movement data according to the magnetic oriented data, the processor sending the processed data to a transmitter located in the body;
    the transmitter being a wireless transmitter for sending signals based on the x and y data and the magnetic orientation data in real time.

2. The mouse of claim 1, wherein:
    the compassing device is a solid state sensor.

3. The mouse of claim 2, wherein:
    the sensor comprises two linear magnetic sensors mounted at 90 degrees to each other.

4. The mouse of claim 1, wherein:
    the mouse includes a user command input switch which is orientation free.

5. The mouse of claim 4, wherein:
    the mouse includes a second user command input switch which is orientation free.

6. The mouse of claim 4, wherein:
    the mouse further comprises a flexible exterior cover under which is located a shell, and a first user command input switch which is activated when the cover is squeezed.

7. The mouse of claim 5, wherein:
    the mouse further comprises a flexible exterior cover under which is located a first user command input switch which is activated when the cover is squeezed and a second user command input switch which is activated when the cover is depressed.

8. The mouse of claim 6, wherein:
    the first user command input switch comprises two or more radial command input switches.

9. The mouse of claim 6, wherein:
    the first user command input switch is assuredly activated when a lower rim of the cover is squeezed at any diametrically opposite positions.

10. The mouse of claim 1, wherein:
    the body is round.

11. The mouse of claim 1, wherein:
    the body is round and has mounted on it a base orientation switch which communicates with the processor.

12. The mouse of claim 10, further comprising:

a ball bearings assembly interposed between the body and a retaining ring, the assembly providing the mouse with a lower friction coefficient in a rotational mode than in a linear mode.

13. The mouse of claim 1, further comprising:

a compass disabling switch.

14. The mouse of claim 1, further comprising:

a first circuit board on which is mounted an optical sensor for generating x and y data.

15. The mouse of claim 1, further comprising:

a circuit board carrying a vertically oriented user command input switch.

16. The mouse of claim 14, further comprising:

a second circuit board, located above the first circuit board, the second circuit board carrying batteries for operating the mouse.

17. The mouse of claim 15, further comprising:

a semi-rigid shell interposed between a flexible outer cover and the circuit board;

the shell transmitting a downward force from the cover to the vertically oriented switch.

18. The mouse of claim 6, wherein:

the first user command input switch comprises three switches located at generally one hundred and twenty degrees to one another.

* * * * *

UNITED STATES PATENT AND TRADEMARK OFFICE
CERTIFICATE OF CORRECTION

| | | |
|---|---|---|
| PATENT NO. | : 7,154,475 B2 | |
| APPLICATION NO. | : 10/718595 | |
| DATED | : December 26, 2006 | |
| INVENTOR(S) | : Laurence James Crew | |

It is certified that error appears in the above-identified patent and that said Letters Patent is hereby corrected as shown below:

The Title page of the Patent Item (30); Please insert;

Country: Australia    Priority No.: 2002952977    Priority Date: 28 November 2002

Signed and Sealed this

Twenty-sixth Day of June, 2007

JON W. DUDAS
*Director of the United States Patent and Trademark Office*